US 9,941,815 B2

United States Patent
Hida et al.

(10) Patent No.: US 9,941,815 B2
(45) Date of Patent: Apr. 10, 2018

(54) POWER CONVERSION APPARATUS WITH OVERCURRENT SIMULATING CIRCUIT

(71) Applicant: Hitachi Automotive Systems, Ltd., Hitachinaka-shi, Ibaraki (JP)

(72) Inventors: Shinichirou Hida, Hitachinaka (JP); Hideyuki Sakamoto, Hitachinaka (JP); Satoru Shigeta, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/325,790

(22) PCT Filed: Jun. 29, 2015

(86) PCT No.: PCT/JP2015/068604
§ 371 (c)(1),
(2) Date: Jan. 12, 2017

(87) PCT Pub. No.: WO2016/021329
PCT Pub. Date: Feb. 11, 2016

(65) Prior Publication Data
US 2017/0207722 A1    Jul. 20, 2017

(30) Foreign Application Priority Data

Aug. 4, 2014    (JP) ................... 2014-158488

(51) Int. Cl.
*H02M 7/537*    (2006.01)
*H02M 1/08*    (2006.01)
(Continued)

(52) U.S. Cl.
CPC ............. *H02M 7/537* (2013.01); *H02M 1/08* (2013.01); *H02M 1/32* (2013.01); *H02P 29/027* (2013.01);
(Continued)

(58) Field of Classification Search
CPC ......... H02M 3/33507; H02M 3/33523; H02M 2001/0032; H02M 7/06; H02M 7/066;
(Continued)

(56) References Cited

U.S. PATENT DOCUMENTS

| 2009/0040724 A1* | 2/2009 | Nishikimi ........ H05K 7/20927 361/699 |
| 2013/0051099 A1* | 2/2013 | Tateyama ............ H02M 7/5387 363/97 |

(Continued)

FOREIGN PATENT DOCUMENTS

| JP | 2005-20843 A | 1/2005 |
| JP | 2011-101466 A | 5/2011 |
| JP | 2013-192418 A | 9/2013 |

OTHER PUBLICATIONS

International Search Report (PCT/ISA/210) issued in PCT Application No. PCT/JP2015/068604 dated Sep. 29, 2015 with English translation (4 pages).

(Continued)

Primary Examiner — Yemane Mehari
(74) Attorney, Agent, or Firm — Crowell & Moring LLP

(57) ABSTRACT

An object of the invention is to diagnose whether an overcurrent detecting function with respect to a power semiconductor element of a power conversion apparatus is normal. The power conversion apparatus of the invention is provided with IGBTs as the power semiconductor element which performs a switching operation to convert DC power supplied from a DC power source into AC power, an overcurrent detecting circuit, and an overcurrent simulating circuit. The IGBTs include an emitter sensing terminal which outputs a sense current according to a current flowing to an emitter electrode. The overcurrent detecting circuit detects the overcurrent flowing to the IGBTs on the basis of the sense current output from the emitter sensing terminal.

(Continued)

The overcurrent simulating circuit outputs a simulation signal which simulates the overcurrent flowing to the IGBTs and toward the overcurrent detecting circuit.

8 Claims, 3 Drawing Sheets

(51) Int. Cl.
    *H02M 1/32*     (2007.01)
    *H02P 29/024*     (2016.01)
    *H02M 1/00*     (2006.01)
    *H02P 27/08*     (2006.01)

(52) U.S. Cl.
    CPC ..... *H02M 2001/0009* (2013.01); *H02P 27/08* (2013.01)

(58) Field of Classification Search
    CPC .......... H02M 7/445; H02M 7/48; H02M 7/51; H02M 7/525; H02M 7/5387; H02M 7/53871; H02M 7/53875; G05F 1/42
    USPC ..................... 363/95–98, 109, 113, 120, 122
    See application file for complete search history.

(56) References Cited

U.S. PATENT DOCUMENTS

| | | | |
|---|---|---|---|
| 2014/0085955 A1* | 3/2014 | Maeda | H02M 7/003 363/132 |
| 2014/0321171 A1* | 10/2014 | Fujita | H02M 1/14 363/37 |
| 2015/0382501 A1* | 12/2015 | Horiuchi | H05K 7/20927 363/131 |

OTHER PUBLICATIONS

Japanese-language Written Opinion (PCT/ISA/237) issued in PCT Application No. PCT/JP2015/068604 dated Sep. 29, 2015 (3 pages).

\* cited by examiner

POWER CONVERSION APPARATUS WITH OVERCURRENT SIMULATING CIRCUIT

TECHNICAL FIELD

The present invention relates to a power conversion apparatus.

BACKGROUND ART

Conventionally, a power conversion apparatus (inverter) has been widely used for the purpose of driving a motor for running a vehicle, which is mounted in a vehicle such as an electric vehicle (EV) or a hybrid electric vehicle (HEV) and converts DC power into AC power. Such a power conversion apparatus generally includes a semiconductor element called a power semiconductor element as a switching element, and converts the DC power into the AC power using the power semiconductor element.

In the power conversion apparatus described above, there is a concern about that the power semiconductor element may be broken when an overcurrent flows due to a short circuit. Therefore, PTL 1 discloses a power conversion apparatus as a technique of preventing the power semiconductor element from being broken due to the overcurrent. The power conversion apparatus is provided with a transistor having as emitter sensing terminal as the switching element, and detects a magnitude of a sense current outputting from the emitter sensing terminal according to a current flowing to the transistor to detect the overcurrent.

CITATION LIST

Patent Literature

PTL 1: JP 2013-192418 A

SUMMARY OF INVENTION

Technical Problem

In the power conversion apparatus disclosed in PTL 1, the magnitude of the sense current outputting from the emitter sensing terminal of the switching element is detected using a shunt resistor and a comparator. Therefore, since the magnitude of the sense current cannot be accurately detected in a case where these circuits are broken, an overcurrent detection cannot be correctly performed. As a result, it is not possible to sufficiently prevent that the overcurrent flows to the switching element, which may cause the switching element to be broken.

The invention has been made to solve such a conventional problem. A main object of the invention is to diagnose whether an overcurrent detecting function with respect to a power semiconductor element of a power conversion apparatus is normal.

Solution to Problem

A power conversion apparatus according to the present invention includes: a power semiconductor element that includes an emitter electrode and an emitter sensing terminal through which a sense current is output according to a current flowing to the emitter electrode, and performs a switching operation to convert DC power supplied from a DC power source into AC power; an overcurrent detecting circuit that detects an overcurrent flowing to the power semiconductor element on the basis of the sense current; and an overcurrent simulating circuit that outputs a simulation signal simulating the overcurrent to the overcurrent detecting circuit.

Advantageous Effects of Invention

According to the invention, it is possible to diagnose whether an overcurrent detecting function with respect to a power semiconductor element of a power conversion apparatus is normal.

DESCRIPTION OF EMBODIMENTS

Figure 1:
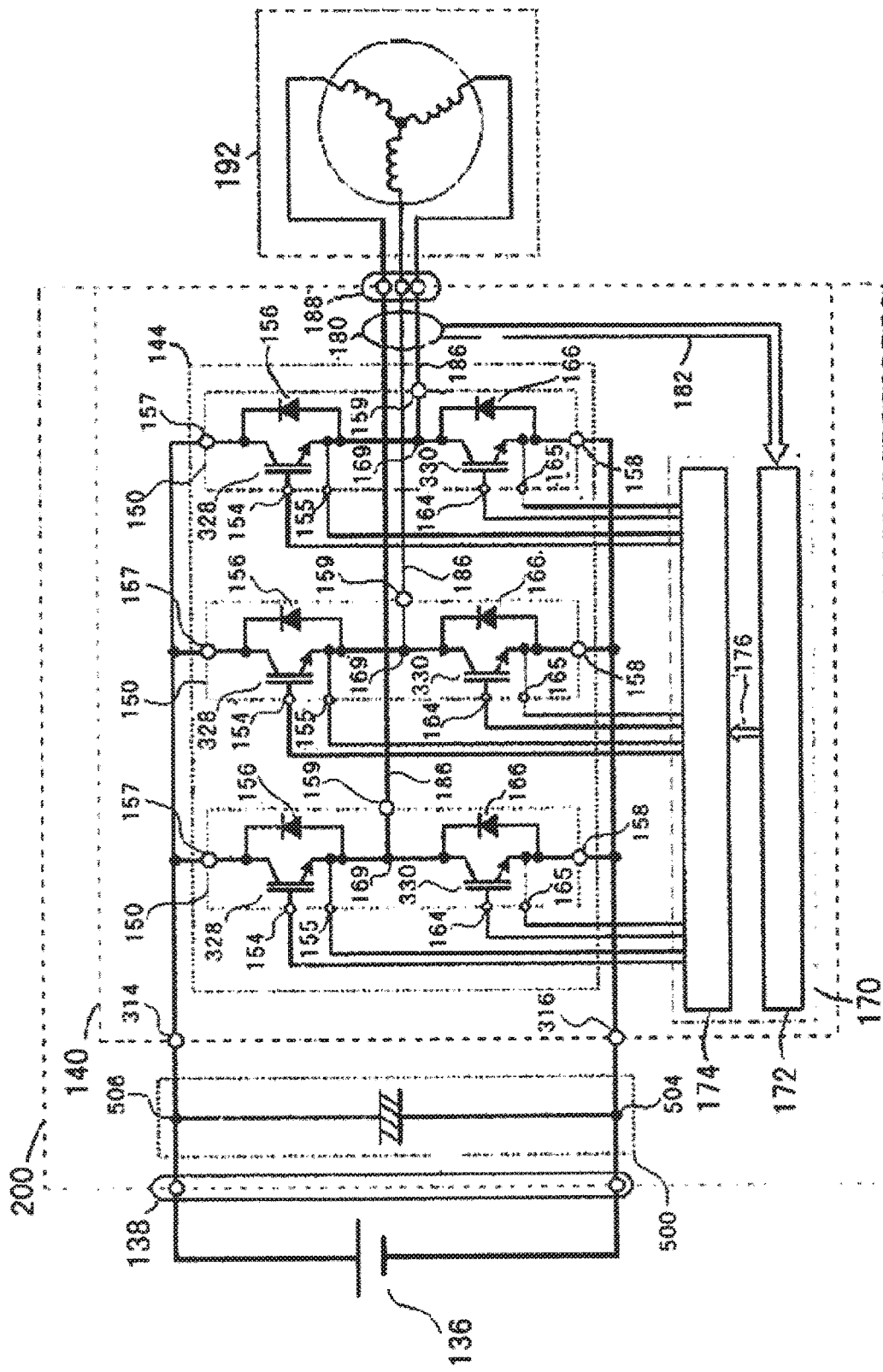
FIG. 1 is a diagram illustrating a basic configuration of a power conversion apparatus according to an embodiment of the invention.

FIG. 1 is a diagram illustrating a basic configuration of a power conversion apparatus according to an embodiment of the invention. A power conversion apparatus 200 according to this embodiment is provided with an inverter apparatus 140 and a capacitor module 500. The inverter apparatus 140 includes an inverter circuit 144 and a control unit 170. The inverter circuit 144 includes three upper/lower arm series circuits 150. Each upper/lower arm series circuit 150 is configured by an Insulated Gate Bipolar Transistor (IGBT) 328 and a diode 156 which operate as an upper arm, and an IGBT 330 and a diode 166 which operate as a lower arm. The inverter apparatus 140 is connected from a center portion (an intermediate electrode 169) of each upper/lower arm series circuit 150 to an AC power line (AC bus bar) 186 toward a motor generator 192 through an AC terminal 159.

The control unit 170 includes a drive circuit 174 for driving control of the inverter circuit 144, and a control circuit 172 for supplying a control signal to the drive circuit 174 through a signal line 176.

The upper arm IGBT 328 and the lower arm IGBT 330 of the power conversion apparatus 200 are switching power semiconductors. These power semiconductor elements operate when receiving a drive signal output from the control unit 170 and converts DC power supplied from a battery 136 into a three-phase AC power. The converted power is supplied to an armature winding of the motor generator 192. Further, the inverter apparatus 140 can convert the three-phase AC power generated by the motor generator 192 into a DC power.

The inverter circuit 144 is configured by a three-phase bridge circuit, in which three upper/lower arm series circuits 150 are electrically connected in parallel between a DC positive terminal 314 and a DC negative terminal 316. The DC positive terminal 314 and the DC negative terminal 316 are connected to a positive electrode and a negative electrode of the battery 136, respectively.

In this embodiment, the IGBTs 328 and 330 are exemplified as switching power semiconductor elements. The IGBTs 328 and 330 each are provided with a collector electrode, an emitter electrode, and a gate electrode. The diodes 156 and 166 are electrically connected between the collector electrode and the emitter electrode of the IGBTs 328 and 330 respectively as illustrated in the drawing. The diodes 156 and 166 each are provided with two electrodes of a cathode electrode and an anode electrode. The cathode electrode and the anode electrode of the diodes 156 and 166 each are electrically connected to the collector electrode and the emitter electrode of the IGBTs 328 and 330 such that a direction from the emitter electrode to the collector electrode of the IGBTs 328 and 330 becomes a forward direction.

In the inverter circuit 144, three upper/lower arm series circuits 150 are provided in correspondence with the respective phases of the armature windings of the motor generator 192. The three upper/lower arm series circuits 150 form the respective U, V, and W chase arms with respect to the motor generator 192 through the intermediate electrode 169 and the AC terminal 159 which connect the emitter electrode of the IGBT 328 and the collector electrode of the IGBT 330. The upper/lower arm series circuits 150 are electrically connected to each other in parallel. In each arm, the collector electrode of the IGBT 328 of the upper arm is electrically connected to a positive electrode of a capacitor of the capacitor module 500 through a positive terminal (P terminal) 157 and the DC positive terminal 314, and the emitter electrode of the IGBT 330 of the lower arm is electrically connected to a negative electrode of the capacitor of the capacitor module 500 through a negative terminal (N terminal) 158 and the DC negative terminal 316. The intermediate electrode 169 of each arm is electrically connected to a phase winding corresponding to the armature winding of the motor generator 192 through the AC terminal 159 and an AC connector 188. Furthermore, the upper/lower arm series circuit 150 is provided with a signal terminal 155 and a gate electrode terminal 154 for the upper arm, and a signal terminal 165 and a gate electrode terminal 164 for the lower arm in addition to the positive terminal 157, the negative terminal 158, and the AC terminal 159.

The capacitor module 500 is configured to form a smoothing circuit for controlling a variation in DC voltage generated by the switching operations of the IGBTs 328 and 330. In the positive electrode of the capacitor of the capacitor module 500, the positive electrode of the battery 136 is electrically connected through a positive terminal 506 of the capacitor and a DC connector 138. In the negative electrode of the capacitor of the capacitor module 500, a negative electrode of the battery 136 is electrically connected through a negative terminal 504 of the capacitor and the DC connector 138. With this configuration, the capacitor module 500 is electrically connected in parallel to the upper/lower arm series circuit 150 between the collector electrode of the IGBT 328 of the upper arm and the positive electrode of the battery 136, and between the emitter electrode of the 330 of the lower arm and the negative electrode of the battery 136.

The control unit 170 is configured to operate the IGBTs 328 and 330. In the control unit 170, the control circuit 172 controls the operation of the drive circuit 174 on the basis of input information from other control devices and sensors to generate a control signal to control switch timings of the IGBTs 328 and 330, and outputs the signal to the drive circuit 174. The drive circuit 174 generates a drive signal to control the switching operations of the IGBTs 328 and 330 on the basis of the control signal output from the control circuit 172, and outputs the signal to the IGBTs 328 and 330.

The control circuit 172 is provided with a microcomputer (hereinafter, referred to as "micom") for calculating the switching timings of the IGBTs 328 and 330. In the micom, as input information, a target torque value required for the motor generator 192, a current value to be supplied from the upper/lower arm series circuit 150 to the armature winding of the motor generator 192, and a magnetic pole position of a rotor of the motor generator 192 are input. The target torque value is based on a command signal output from a host control device (not illustrated). The current value is detected on the basis of a detection signal output from a current detection unit 180 through a signal line 182. The magnetic pole position is detected on the basis of a detection signal output from a rotary magnetic pole sensor (not illustrated) installed in the motor generator 192. This embodiment is described giving an example in a case where three-phase current values are detected, but two-phase current values may be detected.

The micom in the control circuit 172 calculates current command values of d and q axes of the motor generator 192 on the basis of the target torque value, and calculates voltage command values of the d and q axes on the basis of the calculated current command values of the d and p axes and a difference between the detected current values of the d and q axes. In addition, the calculated voltage command values of the d and q axes are converted into U, V, and W-phase voltage command values on the basis of the detected magnetic pole position. Then, the micom generates a modulation wave (PWM signal) of a pulse shape on the basis of a comparison between a fundamental wave (sinusoidal wave) and a carrier wave (triangular wave) based on the U, V, and W-phase voltage command values, and outputs the generated PWM signal to the drive circuit 174 as the above-described control signal.

In a case where the lower arm is driven, the drive circuit 174 amplifies the PWM signal and outputs the amplified PWM signal to the gate electrode of the IGBT 330 of the corresponding lower arm as the drive signal. In addition, in a case where the upper arm is driven, the level of a reference potential of the PWM signal is shifted to the level of a reference potential of the upper arm and then the PWM signal is amplified. The amplified PWM signal is output to the gate electrode of the IGBT 328 of the corresponding upper arm as the drive signal. Therefore, the IGBTs 328 and 330 each perform the switching operation on the basis of the input drive signal.

Next, an overcurrent detecting function in the power conversion apparatus 200 will be described. The power conversion apparatus 200 of this embodiment has the overcurrent detecting function for the IGBTs 328 and 330 which are power semiconductor elements. With the use of the overcurrent detecting function, the power conversion apparatus 200 detects an overcurrent flowing to any one of the IGBTs 328 and 330, and stops the output of the drive signal from the drive circuit 174 with respect to the subject IGBT. Therefore, it is possible to prevent that the IGBTs 328 and 330 are broken by the overcurrent.

Furthermore, the power conversion apparatus 200 of this embodiment also has a diagnosis function with respect to the above-described overcurrent detecting function. With the use of the diagnosis function, the power conversion apparatus 200 determines whether the overcurrent detecting function normally works. In a case where it is determined that the function does not normally work, an alarm is issued. Therefore, it is possible to securely prevent that the IGBTs 328 and 330 are broken by the overcurrent caused by a defect of the circuit for realizing the overcurrent detecting function.

Figure 2:
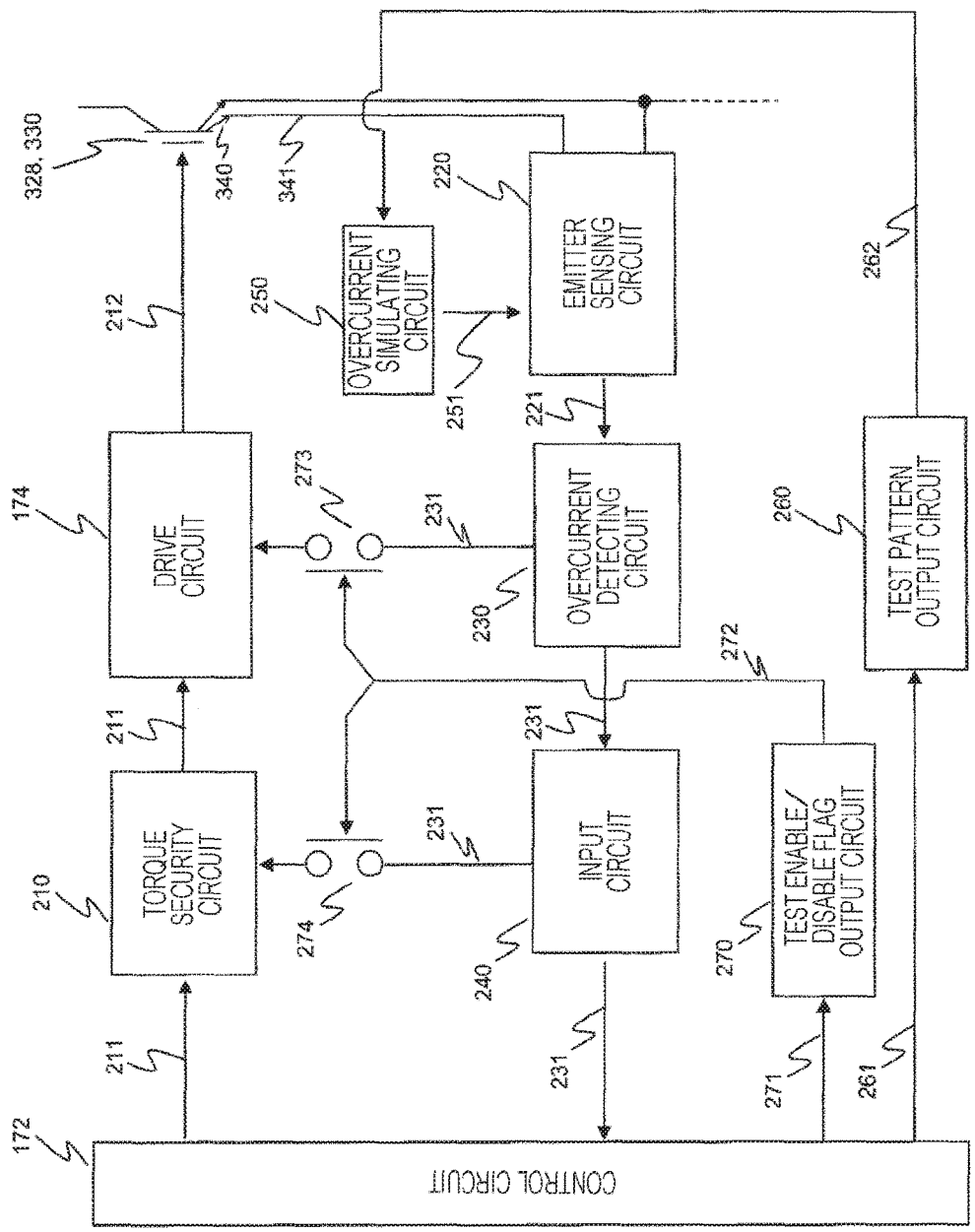
FIG. 2 is a diagram illustrating a configuration of an overcurrent detection/diagnosis circuit in the power conversion apparatus according to the embodiment of the invention.

FIG. 2 is a diagram illustrating a configuration of an overcurrent detection/diagnosis circuit in the power conversion apparatus according to the embodiment of the invention in order to realize the overcurrent detecting function and the diagnosis function. The overcurrent detection/diagnosis circuit is used in combination with the control circuit 172, the drive circuit 174, and the IGBTs 328 and 330 described above, and is provided with a torque security circuit 210, an emitter sensing circuit 220, an overcurrent detecting circuit 230, and an input circuit 240 which correspond to the overcurrent detecting function, and the overcurrent simulating circuit 250, a test pattern output circuit 260, and a test enable/disable flag output circuit 270 which correspond to the diagnosis function. The overcurrent detection/diagnosis circuit is embedded in the control unit 170 or the inverter circuit 144 in FIG. 1.

Further, only one IGBT is illustrated in FIG. 2 as the IGBTs 328 and 330, and the configuration of the overcurrent detection/diagnosis circuit provided in correspondence therewith is illustrated. In practice, the overcurrent detection/diagnosis circuit of the circuit configuration as illustrated in FIG. 2 is provided for each of the IGBTs 328 and 330 illustrated in FIG. 1. Herein, some or all of the circuit configuration illustrated in FIG. 2 may be commonly used between a plurality of IGBTs. In the following, the description will be made using an example of the overcurrent detection/diagnosis circuit corresponding to one IBGT 328 in the IGBTs 328 and 330 illustrated in FIG. 1.

The torque security circuit 210 is configured using a logic circuit, and disposed between the control circuit 172 and the drive circuit 174. The torque security circuit 210 passes a control signal 211 from the control circuit 172 without change in a normal condition, and outputs the signal to the drive circuit 174. However, when an overcurrent is detected in the IGBT 328, the output of the control signal 211 from the control circuit 172 to the drive circuit 174 is blocked. Therefore, the switching operation of the IGBT 328 is stopped, and the operation of the motor generator 192 of FIG. 1 is stopped. At this time, the motor generator 192 may be safely stopped by outputting a predetermined control signal from the torque security circuit 210 to the IGBT 328 in place of the control signal 211. Further, similarly to the case where an overcurrent is detected, the output of the control signal 211 from the control circuit 172 to the drive circuit 174 may be blocked by the torque security circuit 210 even in a case where an overvoltage is detected in the IGBT 328, or in a case where any one of the circuits in the power conversion apparatus 200 is broken.

The drive circuit 174 receives the control signal 211 output from the control circuit 172 through the torque security circuit 210, and outputs a drive signal 212 to the gate electrode of the IGBT 328 on the basis of the control signal 211. The DC power is converted into an AC power as the IGBT 328 performs the switching operation according to the drive signal 212, and the motor generator 192 is driven.

As illustrated in FIG. 2, the IGBT 328 includes an emitter sensing terminal 340 which outputs a sense current according to the current flowing to the emitter electrode. Specifically, for example, about a few hundredth current of the current flowing from the collector electrode to the emitter electrode is output as a sense current 341 from the emitter sensing terminal 340.

The emitter sensing circuit 220 is connected to the emitter sensing terminal 340 of the IGBT 328, and outputs a voltage signal 221 according to a magnitude of the sense current 341 output from the emitter sensing terminal 340 to the overcurrent detecting circuit 230. Specifically, the emitter sensing circuit 220 includes a resistor having a predetermined resistance for example, and converts the sense current 341 into the voltage signal 221 using the resistor. Then, after noises are removed using a filter circuit, the voltage signal 221 is output to the overcurrent detecting circuit 230.

The overcurrent detecting circuit 230 is connected to the emitter sensing circuit 220, and performs an overcurrent detection on the basis of the sense current 341 from the IGBT 328 using the voltage signal 221 output from the emitter sensing circuit 220. Specifically, the overcurrent detecting circuit 230 includes a comparison circuit such as a comparator of which the threshold voltage (overcurrent threshold value) is previously set for determining the overcurrent, and determines whether the voltage signal 221 is equal to or more than the overcurrent threshold value by comparing the voltage signal 221 with the overcurrent threshold value using the comparison circuit. As a result, in a case where it is determined that the voltage signal 221 is equal to or more than the overcurrent threshold value, it is determined that an overcurrent flows to the IGBT 328, and an overcurrent detection signal 231 is output to the input circuit 240 and the drive circuit 174.

The drive circuit 174 is connected to the overcurrent detecting circuit 230 through a switch 273. When the switch 273 is in an ON state, and the overcurrent detection signal 231 is output from the overcurrent detecting circuit 230, the overcurrent detection signal 231 is input to the drive circuit 174. When the overcurrent detection signal 231 is received, the drive circuit 174 stops the output of the drive signal 212 with respect to the IGBT 328. Therefore, in a case where the overcurrent is detected, the overcurrent detecting circuit 230 can inhibit the switching operation of the IGBT 328. In other words, in a case where the overcurrent is detected, the overcurrent detecting circuit 230 has a switching inhibition function of inhibiting the switching operation of the IGBT 328. Further, the switching operation of the IGBT 328 may be inhibited by blocking the drive signal 212 instead of stopping the output of the drive signal 212 from the drive circuit 174.

The input circuit 240 is a circuit for inputting the overcurrent detection signal 231 output from the overcurrent detecting circuit 230 toward the control circuit 172 and the torque security circuit 210, and disposed between the overcurrent detecting circuit 230 and the control circuit 172 and the torque security circuit 210. The input circuit 240 includes a filter circuit for example to eliminate the noises from the overcurrent detection signal 231 by the filter circuit, and outputs the signal to the control circuit 172 and the torque security circuit 210.

The torque security circuit 210 is connected to the input circuit 240 through a switch 274. When the switch 274 is an an ON state, and the overcurrent detection signal 231 is output from the overcurrent detecting circuit 230, the overcurrent detection signal 231 is input to the torque security circuit 210 through the input circuit 240. When the overcurrent detection signal 231 is received, the torque security circuit 210 stops the switching operation of the IGBT 328 by blocking the output of the control signal 211 from the control circuit 172 to the drive circuit 174 as described above. Therefore, in a case where the overcurrent detecting circuit 230 detects the overcurrent, the torque security circuit 210 can be operated.

The overcurrent simulating circuit 250 generates a simulation signal 251 which simulates the overcurrent flowing to the IGBT 328, and outputs the signal to the overcurrent detecting circuit 230 through the emitter sensing circuit 220. Specially, the overcurrent simulating circuit 250 includes an inner power source, and outputs a voltage equal to the voltage signal 221 output from the emitter sensing circuit 220 when the overcurrent flows to the IGBT 328 (that is, a voltage equal to or more than the overcurrent threshold value in the overcurrent detecting circuit 230) as the simulation signal 251 using the inner power source. In this way, the simulation signal 251 output from the overcurrent simulating circuit 250 is input to the overcurrent detecting circuit 230 as the voltage signal 221 through the emitter sensing circuit 220. Alternatively, the simulation signal 251 may be directly output from the overcurrent simulating circuit 250 to the overcurrent detecting circuit 230 without through the emitter sensing circuit 220.

The test pattern output circuit 260 outputs a test pattern signal 262 for controlling a timing for outputting the simulation signal 251 from the overcurrent simulating circuit 250 on the basis of a simulation signal output command 261 from the control circuit 172. The overcurrent simulating circuit 250 starts or stops the output of the simulation signal 251 according to the test pattern signal 262.

The test enable/disable flag output circuit 270 controls switching states of the switches 273 and 274 on the basis of a diagnosis command 271 from the control circuit 172 to output a test enable/disable flag signal 272 for enabling or disabling the diagnosis function. When the switches 273 and 274 each are turned on and off according to the test enable/disable flag signal 272, the output of the overcurrent detection signal 231 from the overcurrent detecting circuit 230 to the drive circuit 174 and the output of the overcurrent detection signal 231 from the input circuit 210 to the torque security circuit 210 can be allowed or inhibited respectively. Therefore, the switching inhibition function of the overcurrent detecting circuit 230 when the overcurrent flows to the IGBT 328 as described above, and the operation of the torque security circuit 210 may be enabled at the time of using the overcurrent detecting function, and may be disabled at the time of using the diagnosis function.

Figure 3:
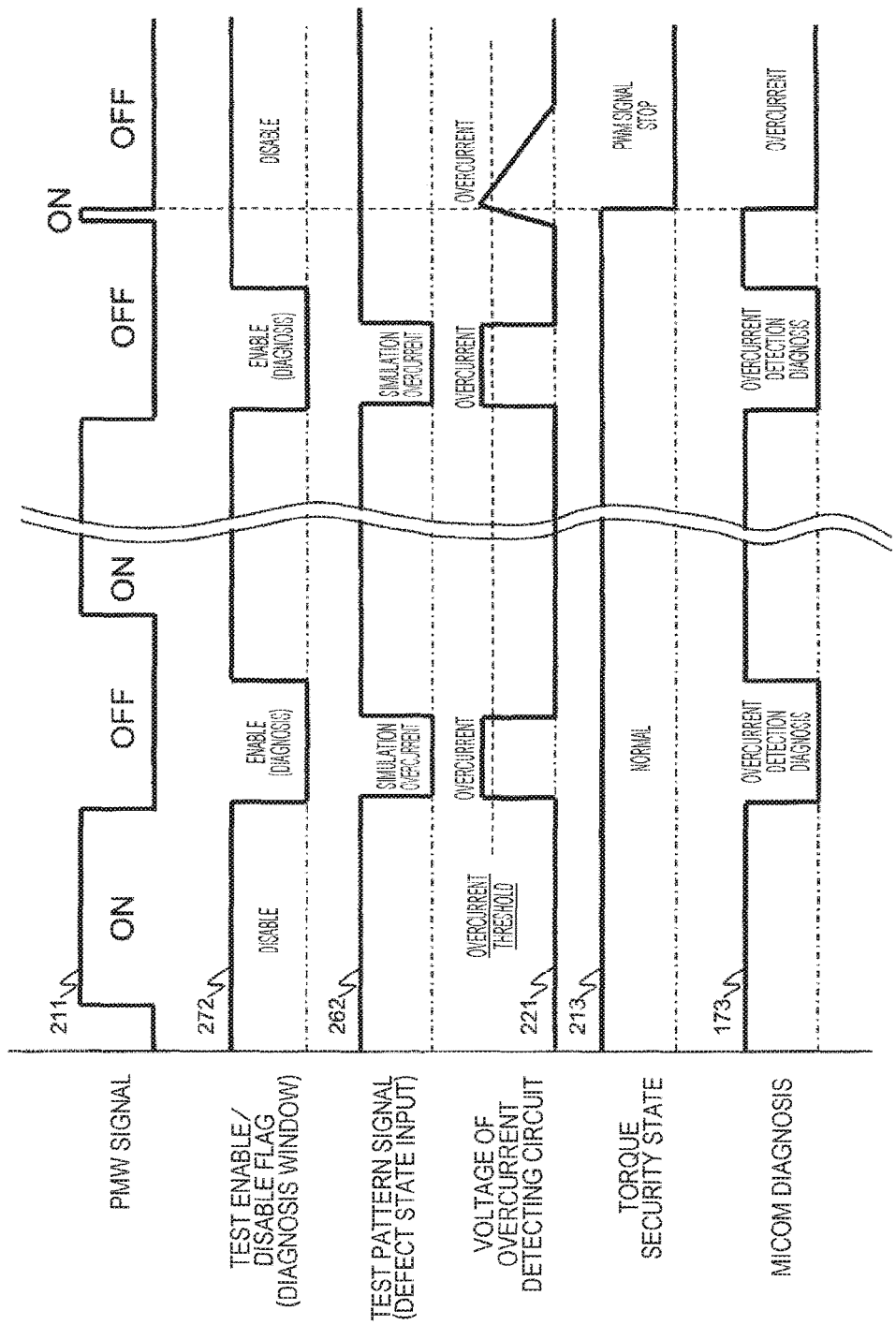
FIG. 3 is a diagram illustrating an example of a diagnosis timing of the overcurrent detection/diagnosis circuit.

FIG. 3 is a diagram illustrating an example of a diagnosis timing of the overcurrent detection/diagnosis circuit of this embodiment described above.

As illustrated in FIG. 3, a PWM signal which turns on/off the IGBT 328 (power semiconductor element) at a predetermined timing (for example, several kHz interval) is output from the control circuit 172 as the control signal 211. The control signal 211 is output to the drive circuit 174 through the torque security circuit 210, and used to generate the drive signal 212 in the drive circuit 174.

When the control signal 211 output from the control circuit 172 is turned off, the test enable/disable flag output circuit 270 outputs, for example, the test enable/disable flag signal 272 as illustrated in FIG. 3 in response to a command from the control circuit 172. The test enable/disable flag signal 272 is a signal to switch the diagnosis to be enable and disable, and functions as a signal for defining a diagnosis window (that is, a time window for performing the diagnosis).

The test pattern output circuit 260 outputs the test pattern signal 262 as illustrated in FIG. 3 in response to a command from the control circuit 172. The output of the simulation signal 251 is commanded by the test pattern signal 262 to the overcurrent simulating circuit 250 within a period where the test enable/disable flag signal 272 is "enable". Herein, when the output of the simulation signal 251 is commanded by the test pattern signal 262 by setting the test enable/disable flag signal 272 to be "enable" when the control signal 211 is turned on, and in a case where the overcurrent flows to the IGBTs 328 and 330 within the period, it is not possible to stop the switching operation of the IGBTs 328 and 330 by correctly detecting the overcurrent. Therefore, in order to avoid such a situation, it is desirable that the test enable/disable flag signal 272 is set to be "enable" when the control signal 211 is turned off to command the output of the simulation signal 251 by the test pattern signal 262.

The voltage signal 221 as illustrated in FIG. 3 is input from the emitter sensing circuit 220 to the overcurrent detecting circuit 230. The voltage signal 221 changes to exceed the above-described overcurrent threshold value set in the overcurrent detecting circuit 230 while the simulation signal 251 is output from the overcurrent simulating circuit 250 according to the test pattern signal 262. In addition, even when the overcurrent flows to the IGBT 328, the voltage signal changes up to a value exceeding the overcurrent threshold value. In this way, when the voltage signal 221 exceeds the overcurrent threshold value, the overcurrent is detected in the overcurrent detecting circuit 230, and the overcurrent detection signal 231 is output.

A torque security state 213 indicates a state of the control signal 211 blocked by the torque security circuit 210. When the voltage signal 221 input to the overcurrent detecting circuit 230 is less than the overcurrent threshold value, the overcurrent detection signal 231 is not output from the overcurrent detecting circuit 230. Therefore, the torque security circuit 210 at this time is in a normal state as shown by the torque security state 213, and the output of the control signal 211 from the control circuit 172 to the drive circuit 174 is passed through without any change. In addition, when the test pattern signal 262 commands the output of the simulation signal 251, the switch 274 becomes the OFF state because the test enable/disable flag signal 272 is set to be "enable", and the overcurrent detection signal 231 is not input to the torque security circuit 210. Therefore, even in this time, the torque security circuit 210 is also in the normal state as shown by the torque security state 213, and the output of the control signal 211 from the control circuit 172 to the drive circuit 174 is passed through without any change.

On the other hand, when the overcurrent flows to the IGBT 328, the switch 274 becomes the ON state because the test enable/disable flag signal 272 is set to be "disable", and the overcurrent detection signal 231 is Input to the torque security circuit 210. Therefore, the torque security circuit 210 at this time blocks the output of the control signal 211 from the control circuit 172 to the drive circuit 174 as shown by the torque security state 213.

A micom diagnosis 173 shows a diagnosis state of the control circuit 172. When the test enable/disable flag signal 272 is set to be "enable", the control circuit 172 performs the diagnosis on the overcurrent detecting function as shown by the micom diagnosis 173. Specifically, when the simulation signal 251 is output from the overcurrent simulating circuit 250 according to the test pattern signal 262, it is determined whether the overcurrent detection signal 231 is correctly input from the overcurrent detecting circuit 230 through the input circuit 240. Therefore, it is diagnosed whether the overcurrent detecting circuit 230 and the input circuit 240 are normally operated. On the other hand, in a case where the overcurrent detection signal 231 is input when the simulation signal 251 is not output from the overcurrent simulating circuit 250, the control circuit 172 determines that the overcurrent flows to the IGBT 328 as shown by the micom diagnosis 173.

According to the embodiment of the invention described above, the following operational effects are achieved.

(1) The power conversion apparatus 200 is provided with the IGBTs 328 and 330, the overcurrent detecting circuit 230, and the overcurrent simulating circuit 250 as power semiconductor elements which perform the switching operation to convert the DC power supplied from the DC power source into the AC power. Each of the IGBTs 328 and 330 has the emitter sensing terminal 340 which outputs the sense current 341 according to the current flowing to the emitter electrode. The overcurrent detecting circuit 230 detects the overcurrent flowing to the IGBTs 328 and 330 on the basis of the sense current 341 output from the emitter sensing terminal 340. The overcurrent simulating circuit 250 outputs the simulation signal 251 which simulates the overcurrent flowing to the IGBTs 328 and 330 toward the overcurrent detecting circuit 230. Therefore, it is possible to diagnose whether the overcurrent detecting function is normal with respect to the power semiconductor element of the power conversion apparatus 200.

(2) The power conversion apparatus 200 is further provided with the emitter sensing circuit 220 which outputs the voltage signal 221 according to a magnitude of the sense current 341. The overcurrent detecting circuit 230 determines whether the overcurrent flows to the IGBTs 328 and 330 by determining whether the voltage signal 221 output from the emitter sensing circuit 220 is equal to or more than a predetermined overcurrent threshold value. The overcurrent simulating circuit 250 outputs a voltage equal to or more than the overcurrent threshold value to the overcurrent detecting circuit 230 through the emitter sensing circuit 220 as the simulation signal 251. Therefore, the overcurrent flowing the IGBTs 328 and 330 and the simulation signal 251 can be securely detected in the overcurrent detecting circuit 230.

(3) The power conversion apparatus 200 is further provided with the test pattern output circuit 260 which outputs the test pattern signal 262 to control a taming at which the simulation signal 251 is output from the overcurrent simulating circuit 250. Therefore, the simulation signal 251 is output from the overcurrent simulating circuit 250 at an arbitrary timing, and the overcurrent detecting function can be diagnosed.

(4) The power conversion apparatus 200 is further provided with the drive circuit 174 which outputs the drive signal 212 to control the switching operation of the IGBTs 328 and 330, and the control circuit 172 which outputs the control signal 211 to control the operation of the drive circuit 174. When not outputting the control signal 211 from the control circuit 172, the test pattern output circuit 260 is desirably output the test pattern signal 262 such that the simulation signal 251 is output from the overcurrent simulating circuit 250. In this way, in a case where the overcurrent flows to the IGBTs 328 and 330 in the middle of diagnosing the overcurrent detecting function, it is possible to avoid a situation in which the overcurrent is not correctly detected.

(5) The overcurrent detecting circuit 230 has the switching inhibition function of inhibiting the switching operation of the IGBTs 328 and 330 by outputting the overcurrent detection signal 231 to the drive circuit 174 to stop or block the output of the drive signal 212 from the drive circuit 174 in a case where the overcurrent is detected. When the simulation signal 251 is output from the overcurrent simulating circuit 250, the switch 273 is turned off by setting the test enable/disable flag signal 272 output from the test enable/disable flag output circuit 270 to be "enable" so as to disable the switching inhibition function of the overcurrent detecting circuit 230. Therefore, it is possible to prevent the switching operation of the IGBTs 328 and 330 from being erroneously stopped by the switching inhibition function of the overcurrent detecting circuit 230 in the middle of diagnosing the overcurrent detecting function.

(6) The power conversion apparatus 200 is further provided with the torque security circuit 210 which blocks the output of the control signal 211 from the control circuit 172 to the drive circuit 174 in a case where the overcurrent detecting circuit 230 detects the overcurrent. When the simulation signal 251 is output from the overcurrent simulating circuit 250, the switch 274 is turned off by setting the test enable/disable flag signal 272 output from the test enable/disable flag output circuit 270 to be "enable" so as to disable the torque security circuit 210. Therefore, it is possible to prevent the switching operation of the IGBTs 328 and 330 from being erroneously inhibited by the torque security circuit 210 in the middle of diagnosing the overcurrent detecting function.

Further, the embodiment has been described using an example in which the test enable/disable flag signal 272 output from the test enable/disable flag output circuit 270 is set to be "enable" and the test pattern output circuit 260 outputs the test pattern signal 262 to output the simulation signal 251 from the overcurrent simulating circuit 250 when the control signal 211 output from the control circuit 172 is turned off, so as to perform the diagnosis of the overcurrent detecting function. However, the overcurrent detecting function may be diagnosed at other timing. For example, the test enable/disable flag signal 272 output from the test enable/disable flag output circuit 270 is set to be "enable" and the test pattern output circuit 260 outputs the test pattern signal 262 to output the simulation signal 251 from the overcurrent simulating circuit 250 when the DC power is not supplied from the battery 136 (DC power source), so as to perform the diagnosis of the overcurrent detecting function. Specifically, for example, in a case where the power conversion apparatus 200 is used to drive a motor for running a vehicle, the diagnosis of the overcurrent detecting function may be performed immediately after a key switch of the vehicle is turned off after the running. With such a configuration, it is possible to securely perform the diagnosis of the overcurrent detecting function without affecting the switching operation of the IGBTs 328 and 330.

The above-described embodiments and various modifications are described as merely exemplary, and the invention is not limited to these contents as long as the features of the invention are not spoiled. The invention is not limited to the above-described embodiments, and various changes can be made within a scope not departing from the spirit of the invention.

REFERENCE SIGNS LIST 172 control circuit
174 drive circuit
200 power conversion apparatus
210 torque security circuit
220 emitter sensing circuit
230 overcurrent detecting circuit
240 input circuit
250 overcurrent simulating circuit
260 test pattern output circuit
270 test enable/disable flag output circuit
328, 330 IGBT
340 emitter sensing terminal

The invention claimed is:
1. A power conversion apparatus, comprising:
a power semiconductor element that includes an emitter electrode and an emitter sensing terminal through which a sense current is output according to a current flowing to the emitter electrode, and performs a switch- ing operation to convert DC power supplied from a DC power source into AC power;

an overcurrent detecting circuit that detects an overcurrent flowing to the power semiconductor element on the basis of the sense current; and an overcurrent simulating circuit that outputs a simulation signal simulating the overcurrent to the overcurrent detecting circuit.

2. The power conversion apparatus according to claim 1, further comprising:

an emitter sensing circuit that outputs a voltage according to a magnitude of the sense current, wherein the overcurrent detecting circuit determines whether the overcurrent flows to the power semiconductor element by determining whether the voltage output from the emitter sensing circuit is equal to or more than a predetermined threshold value, and wherein the overcurrent simulating circuit outputs the voltage equal to or more than the threshold value to the overcurrent detecting circuit as the simulation signal through the emitter sensing circuit.

3. The power conversion apparatus according to claim 1, further comprising:

a test pattern output circuit that outputs a test pattern signal to control a timing of outputting the simulation signal from the overcurrent simulating circuit.

4. The power conversion apparatus according to claim 3, further comprising:

a drive circuit that outputs a drive signal to control a switching operation of the power semiconductor element; and a control circuit that outputs a control signal to control an operation of the drive circuit, wherein the test pattern output circuit outputs the test pattern signal to output the simulation signal from the overcurrent simulating circuit when the control signal is not output from the control circuit.

5. The power conversion apparatus according to claim 3, wherein the test pattern output circuit outputs the test pattern signal to output the simulation signal from the overcurrent simulating circuit when the DC power is not supplied from the DC power source.

6. The power conversion apparatus according to claim 1, further comprising:

a drive circuit that outputs a drive signal to control a switching operation of the power semiconductor element, wherein the overcurrent detecting circuit has a switching inhibition function of stopping or blocking the output of the drive signal from the drive circuit to inhibit the switching operation of the power semiconductor element in a case where the overcurrent is detected, and wherein the switching inhibition function is disabled when the simulation signal is output from the overcurrent simulating circuit.

7. The power conversion apparatus according to claim 1, further comprising:

a drive circuit that outputs a drive signal to control a switching operation of the power semiconductor element;

a control circuit that outputs a control signal to control an operation of the drive circuit; and a torque security circuit that blocks the output of the control signal from the control circuit to the drive circuit in a case where the overcurrent detecting circuit detects the overcurrent, wherein the torque security circuit is disabled when the simulation signal is output from the overcurrent simulating circuit.

8. The power conversion apparatus according to claim 2, wherein the overcurrent simulating circuit includes an inner power source that outputs the voltage equal to or more than the threshold value to the overcurrent detecting circuit as the simulation signal through the emitter sensing circuit.

\* \* \* \* \*